(12) United States Patent
Wang

(10) Patent No.: US 8,449,139 B1
(45) Date of Patent: May 28, 2013

(54) LED SUBMARINE LIGHTING DEVICE

(75) Inventor: Yu-Chin Wang, Taipei (TW)

(73) Assignee: Eiko Electric Products Corp., Taipei (TW)

( * ) Notice: Subject to any disclaimer, the term of this patent is extended or adjusted under 35 U.S.C. 154(b) by 0 days.

(21) Appl. No.: 13/301,355

(22) Filed: Nov. 21, 2011

(51) Int. Cl.
*F21V 7/20* (2006.01)

(52) U.S. Cl.
USPC ...... 362/218; 362/219; 362/249.02; 362/267; 362/294; 362/373

(58) Field of Classification Search
USPC .................. 362/218, 219, 221, 234, 249.01, 362/294, 373, 249.02, 267, 800
See application file for complete search history.

(56) References Cited

U.S. PATENT DOCUMENTS

2008/0211429 A1* 9/2008 Saito .............................. 315/312

* cited by examiner

*Primary Examiner* — Stephen F Husar
*Assistant Examiner* — Meghan Dunwiddie
(74) *Attorney, Agent, or Firm* — Guice Patents PLLC

(57) ABSTRACT

A LED submarine lighting device includes a light-transmissive lamp tube, a LED substrate mounted inside the light-transmissive lamp and carrying a plurality of LED devices in the top surface thereof for giving off light, a heat conducting bar mounted in the light-transmissive lamp tube and stopped between the bottom surface of the LED substrate and the inside wall of the light-transmissive lamp tube for quick dissipation of waste heat from the LED devices to avoid the serious problem in brightness attenuation, and two end caps respectively fastened to opposing front and rear ends of the light-transmissive lamp tube in a water-tight manner.

4 Claims, 4 Drawing Sheets

LED SUBMARINE LIGHTING DEVICE

BACKGROUND OF THE INVENTION

1. Field of the Invention

The present invention relates to LED lighting devices and more particularly, to a LED submarine lighting device for underwater application, for example, for use in an aquarium, which is equipped with a heat conducting bar for quick dissipation of waste heat.

2. Description of the Related Art

For the advantage of energy saving and under the demand for carbon reduction, LED lighting industry has become a new generation of the mainstream market.

In an aquarium or ornamental water eco system, a submarine lighting device may be installed to provide illumination and decoration functions. As lighting devices for underwater applications are to be turned on for a long period of time, they commonly use LED components for giving off light, saving the consumption of power supply. However, using a LED light device requires quick heat dissipation, avoiding attenuation of LED brightness. Conventional LED submarine lighting devices may not provide a heat-dissipation device. Even a LED submarine lighting device is equipped with a heat-dissipation device, the heat dissipation effect is still not optimal. After a long use of a conventional LED submarine lighting device, the problem of attenuation of LED brightness will occur. An improvement in this regard is necessary.

SUMMARY OF THE INVENTION

The present invention has been accomplished under the circumstances in view. It is therefore the main object of the present invention to provide a LED submarine lighting device, which is equipped with a heat conducting bar that dissipates waste heat from the LED components rapidly during operation of the LED submarine lighting device.

To achieve this and other objects of the present invention, a LED submarine lighting device comprises: a light-transmissive lamp tube, which comprises opposing front-end opening and rear-end opening and two longitudinal locating grooves bilaterally located on the inside wall thereof between the front-end opening and the rear-end opening, a LED substrate, which is an aluminum clad circuit board fastened to the longitudinal locating grooves inside the light-transmissive lamp and carrying a plurality of LED devices in the top surface thereof for giving off light, a heat conducting bar, which is mounted in the light-transmissive lamp tube and stopped between the bottom surface of the LED substrate and the inside wall of the light-transmissive lamp tube for dissipating waste heat from the LED substrate, a front-end cap sealing the front-end opening of the light-transmissive lamp tube in a water-tight manner, and a rear-end cap sealing the rear-end opening of the light-transmissive lamp tube in a water-tight manner.

Subject to the arrangement of the heat conducting bar, the invention greatly enhances the heat dissipation ability of the LED substrate, maintaining the brightness and performance of the LED devices for a long period of time and avoiding the serious problem in brightness attenuation. In one same size of aquarium, subject to the application of the present invention, it is not necessary to increase the outer diameter or length of the lighting device in order to enhance the brightness, and therefore, the invention exhibits a high degree of competitiveness.

Further, the heat conducting bar can be made having a cross section in any of a variety of shapes.

In one example of the present invention, the heat conducting bar comprises a top cut-face abutted against the bottom surface of the LED substrate, and a circularly curved periphery kept in contact with the inside wall of the light-transmissive lamp tube.

Other advantages and features of the present invention will be fully understood by reference to the following specification in conjunction with the accompanying drawings, in which like reference signs denote like components of structure.

DETAILED DESCRIPTION OF THE PREFERRED EMBODIMENT

Figure 1:
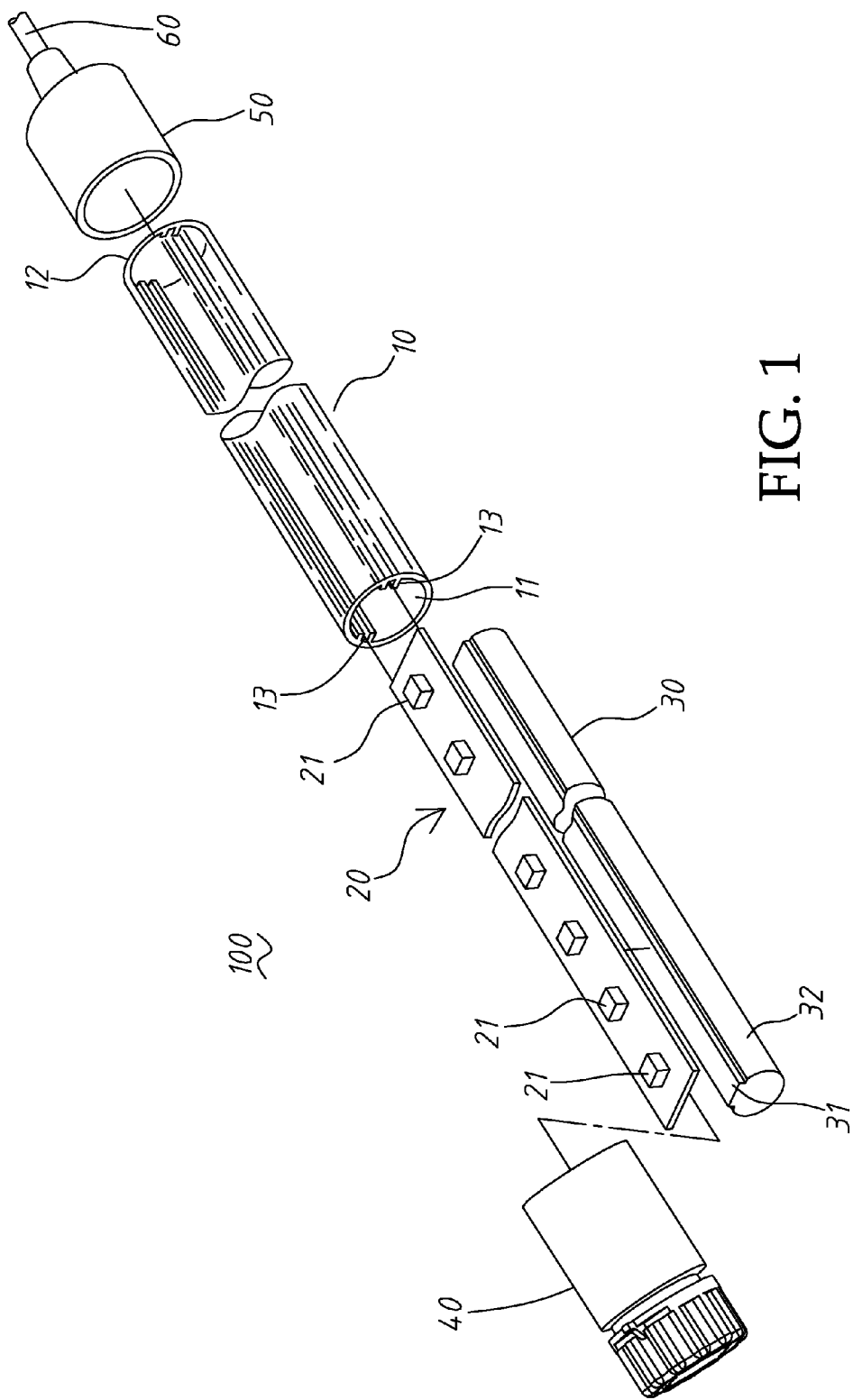
FIG. 1 is an exploded view of a LED submarine lighting device in accordance with the present invention.
Figure 2:
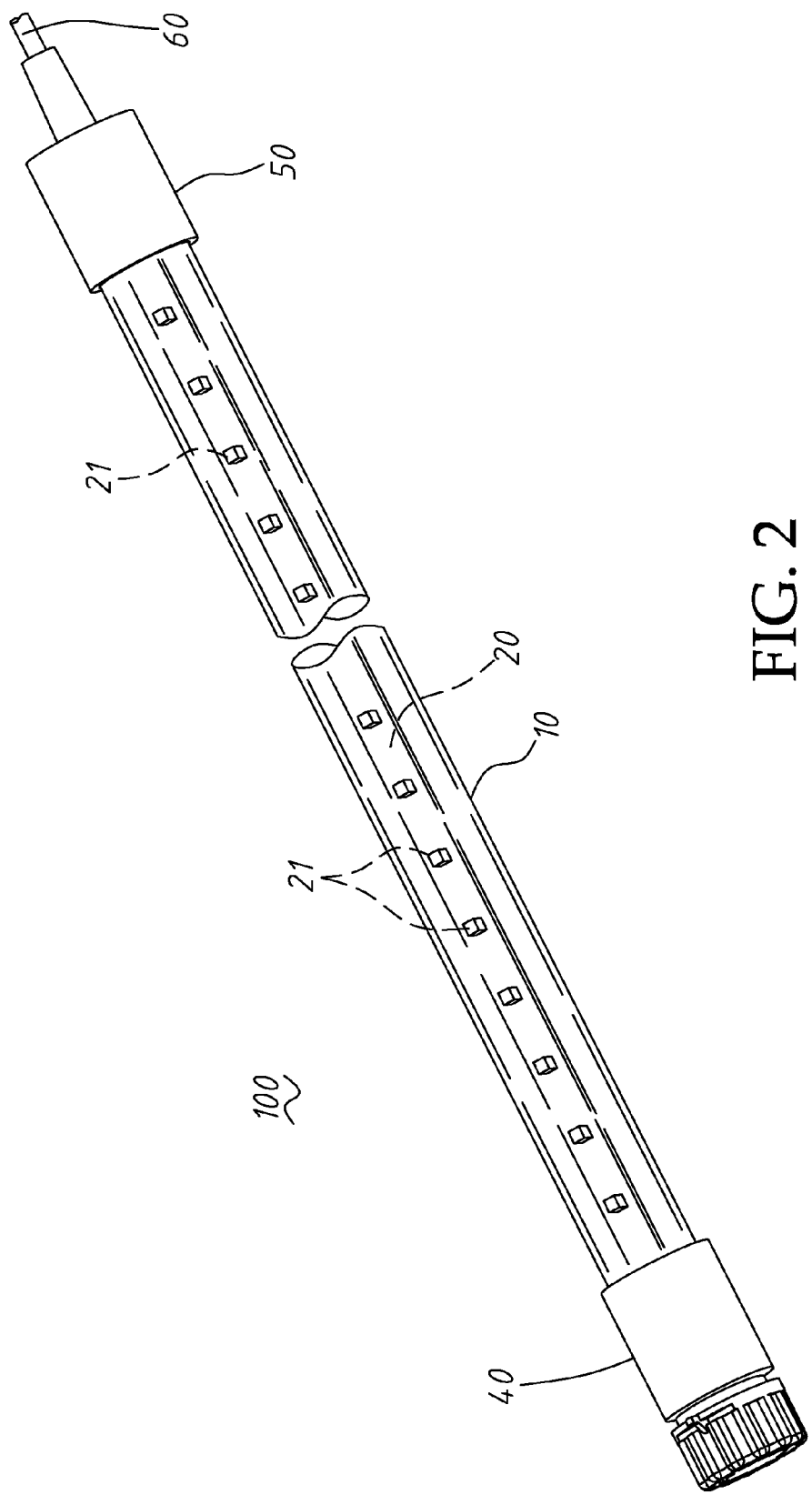
FIG. 2 is a schematic assembly view of the LED submarine lighting device in accordance with the present invention.
Figure 3:
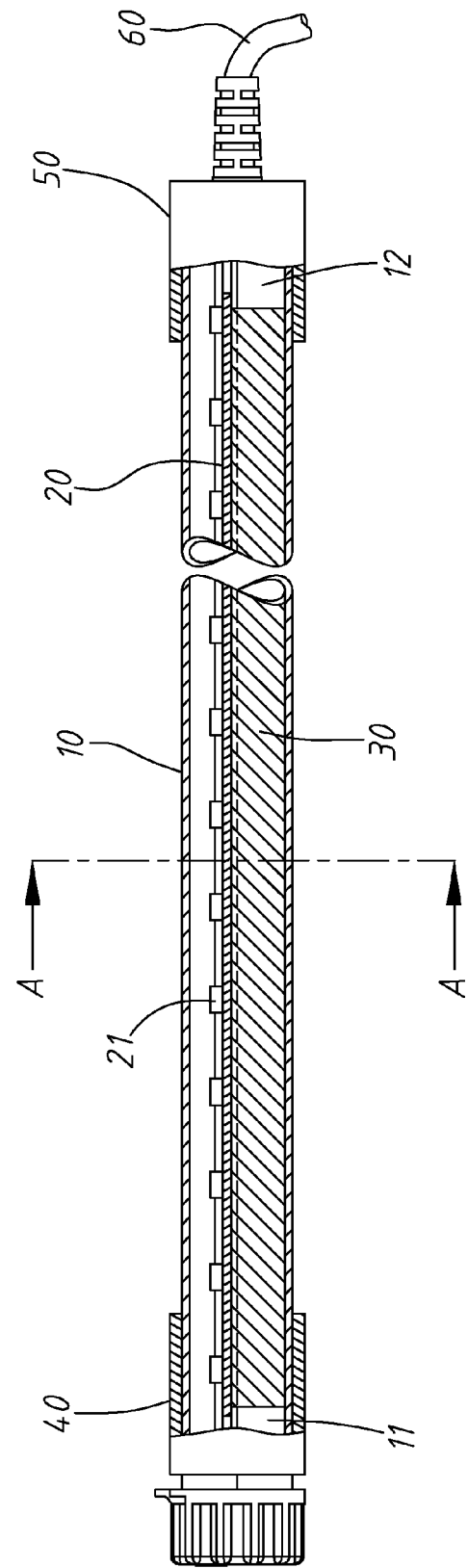
FIG. 3 is a schematic sectional side view of the LED submarine lighting device in accordance with the present invention.

Referring to FIG. 1, a LED submarine light 100 in accordance with the present invention is shown. The LED submarine light 100 comprises a light-transmissive lamp tube 10, a LED substrate 20, a heat conducting bar 30, a front end cap 40 and a rear end cap 50.

The light-transmissive lamp tube 10 can be a plastic tube, comprising opposing front-end opening 11 and rear-end opening 12, and two longitudinal locating grooves 13 symmetrically located on the inside wall thereof at two opposite lateral sides. The LED substrate 20 is an aluminum clad circuit board fastened to the longitudinal locating grooves 13 in the light-transmissive lamp tube 10. Further, the LED substrate 20 has a plurality of LED devices 21 installed in the top surface thereof.

Figure 4:
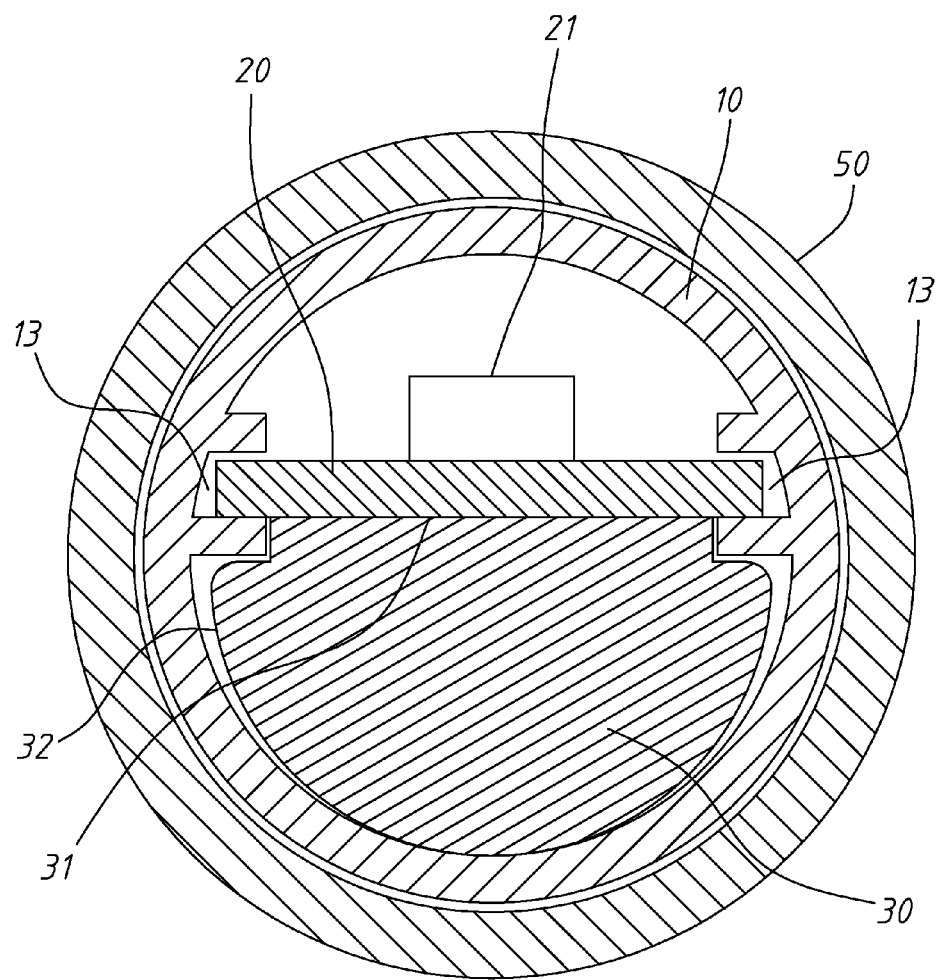
FIG. 4 is a sectional view, in an enlarged scale, taken along line A-A of FIG. 3.

The main feature of the present invention is the arrangement of the heat conducting bar 30 in the light-transmissive lamp tube 10. As shown in FIG. 4, the heat conducting bar 30 is mounted in the light-transmissive lamp tube 10 between the bottom surface of the LED substrate 20 and the inside wall of the light-transmissive lamp tube 10. The heat conducting bar 30 has a top cut-face 31 abutted against the bottom surface of the LED substrate 20, and a circularly curved periphery 32 kept in contact with the inside wall of the light-transmissive lamp tube 10. By means of keeping the heat conducting bar 30 in close contact with the LED substrate 20, waste heat can be quickly dissipated from the LED substrate 20, avoiding attenuation of the brightness of the LED devices 21. It is to be understood that the heat conducting bar 30 is not limited to the configuration shown in FIG. 4. The heat conducting bar 30 can also be made in any of a variety of other shapes. Further, in FIG. 4, the heat conducting bar 30 has a solid structure. Alternatively, the heat conducting bar 30 can have a hollow structure.

Further, the front end cap 40 and the rear end cap 50 are respectively fastened to the front-end opening 11 and rear-end opening 12 of the light-transmissive lamp tube 10 to seal out water. Further, the rear end cap 50 allows for the passing of a power cord 60 that is electrically connected to the LED substrate 20.

The invention, subject to the arrangement of the heat conducting bar 30, greatly enhances the heat dissipation ability of the LED substrate 20, maintaining the brightness and performance of the LED devices 21 for a long period of time and avoiding the serious problem in brightness attenuation. In one same size of aquarium, subject to the application of the present invention, it is not necessary to increase the outer diameter or length of the lighting device in order to enhance the brightness. Therefore, the invention exhibits a high degree of competitiveness.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A LED submarine lighting device, comprising:
    a light-transmissive lamp tube comprising opposing front-end opening and rear-end opening and two longitudinal locating grooves bilaterally located on an inside wall thereof between said front-end opening and said rear-end opening;
    a LED substrate being an aluminum clad circuit board fastened to said longitudinal locating grooves inside said light-transmissive lamp, said LED substrate comprising a plurality of LED devices installed in a top surface thereof for giving off light;
    a heat conducting bar mounted in said light-transmissive lamp tube and stopped between a bottom surface of said LED substrate and the inside wall of said light-transmissive lamp tube for dissipating waste heat from said LED substrate;
    a front-end cap sealing said front-end opening of said light-transmissive lamp tube in a water-tight manner; and
    a rear-end cap sealing said rear-end opening of said light-transmissive lamp tube in a water-tight manner;
    wherein said heat conducting bar comprises a top cut-face abutted against the bottom surface of said LED substrate.

2. The LED submarine lighting device as claimed in claim 1, wherein said heat conducting bar comprises a circularly curved periphery kept in contact with the inside wall of said light-transmissive lamp tube.

3. The LED submarine lighting device as claimed in claim 1, wherein said heat conducting bar has a solid structure.

4. The LED submarine lighting device as claimed in claim 1, wherein said heat conducting bar has a hollow structure.

\* \* \* \* \*